US012339060B2

United States Patent
Chung et al.

(10) Patent No.: US 12,339,060 B2
(45) Date of Patent: Jun. 24, 2025

(54) REFRIGERATOR APPLIANCES AND IMAGE-BASED METHODS OF DETECTING A DOOR POSITION

(71) Applicant: Haier US Appliance Solutions, Inc., Wilmington, DE (US)

(72) Inventors: Myunggeon Chung, Seoul (KR); Jongdeok Jang, Seoul (KR); Jee Eun Oh, Anyang (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 454 days.

(21) Appl. No.: 17/749,784

(22) Filed: May 20, 2022

(65) Prior Publication Data
US 2023/0375258 A1  Nov. 23, 2023

(51) Int. Cl.
*F25D 29/00* (2006.01)
*G06T 7/70* (2017.01)
*G06V 10/22* (2022.01)
*G06V 10/60* (2022.01)

(52) U.S. Cl.
CPC ......... *F25D 29/008* (2013.01); *F25D 29/005* (2013.01); *G06T 7/70* (2017.01); *G06V 10/60* (2022.01); *F25D 2700/02* (2013.01)

(58) Field of Classification Search
CPC .. F25D 29/008; F25D 29/005; F25D 2700/02; F25D 29/00; G06T 7/70; G06V 10/60; G06V 10/225
See application file for complete search history.

(56) References Cited

U.S. PATENT DOCUMENTS

| 9,920,979 | B2 | 3/2018 | Kang et al. | |
|---|---|---|---|---|
| 2014/0145580 | A1* | 5/2014 | Lee | F25D 23/00 312/404 |
| 2016/0201981 | A1* | 7/2016 | Kempfle | F25D 29/00 62/125 |
| 2016/0223250 | A1* | 8/2016 | Kang | H04N 23/651 |
| 2020/0152192 | A1* | 5/2020 | Asada | H04R 29/004 |
| 2021/0125341 | A1 | 4/2021 | Mirza et al. | |

FOREIGN PATENT DOCUMENTS

| FR | 2534675 A1 | 4/1984 |
|---|---|---|
| WO | WO2021137345 A1 | 7/2021 |

* cited by examiner

*Primary Examiner* — Siamak Harandi
(74) *Attorney, Agent, or Firm* — Dority & Manning, P.A.

(57) ABSTRACT

A refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine that includes detecting a door to the chilled chamber in a nominally open position, detecting the door in a nominally closed position following detecting the door in the nominally open position, initiating an image capture sequence to capture a two-dimensional image of the chilled chamber in response to detecting the door in the nominally closed position, and determining a shut state of the door based on the two-dimensional image.

20 Claims, 5 Drawing Sheets

REFRIGERATOR APPLIANCES AND IMAGE-BASED METHODS OF DETECTING A DOOR POSITION

FIELD OF THE INVENTION

The present subject matter relates generally to refrigerator appliances, and more particularly to systems and methods for detecting a position of the door.

BACKGROUND OF THE INVENTION

Refrigerator appliances generally include a cabinet that defines a chilled chamber for receipt of food articles for storage. The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

One of the common problems with existing refrigerator appliances is ensuring the door or doors to a chilled chamber or fully closed. In particular, it is important for such doors to seal the chilled chamber from the ambient environment. Typically, this occurs when a gasket is pressed against with the cabinet or mullion surrounding an opening to the chilled chamber. This will generally seal the chilled chamber and prevent air from passing to or from the chilled chamber. By contrast, If the chilled chamber is not sealed or a door is not otherwise fully closed, air may be permitted to pass to or from the chilled chamber, which may permit a convective heat exchange, hindering performance of the refrigerator appliance's cooling system. This may lead the temperature of the chilled chamber—and items therein—to raise above a desired or set temperature. In the case of freezer chambers, the risks of increased temperatures are especially high since food items may quickly melt, thaw, or spoil with the introduction of ambient air.

Attempts have been made to address such concerns with assemblies for detecting if or when a door is open. Typically, these assemblies have employed simple mechanical switches that engage the door when it is roughly closed. Unfortunately, such systems are imprecise and may be unable to detect when the door is only slightly opened or otherwise not sealed. Moreover, such systems may be unable to detect when a door is likely to suddenly open (e.g., in the case of an overfilled or improperly loaded chilled chamber), such as when an item within the chilled chamber is pressing against the door.

As a result, further improvements for detecting if or when a door of a refrigerator appliance is open would be useful. In particular, it would be advantageous to provide an appliance, system, or method to accurately or efficiently detect when a door is not fully closed (e.g., so that a user can be notified or otherwise address the door).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a refrigerator appliance is provided. The method may include detecting a door to a chilled chamber in a nominally open position and detecting the door in a nominally closed position following detecting the door in the nominally open position. The method may further include initiating an image capture sequence to capture a two-dimensional image of the chilled chamber in response to detecting the door in the nominally closed position. The method may still further include determining a shut state of the door based on the two-dimensional image.

In another exemplary aspect of the present disclosure, a refrigerator appliance is provided. The refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine that includes detecting a door to the chilled chamber in a nominally open position, detecting the door in a nominally closed position following detecting the door in the nominally open position, initiating an image capture sequence to capture a two-dimensional image of the chilled chamber in response to detecting the door in the nominally closed position, and determining a shut state of the door based on the two-dimensional image.

In yet another exemplary aspect of the present disclosure, a method of operating a refrigerator appliance is provided. The method may include initiating an image capture sequence to capture a two-dimensional image of the chilled chamber. The method may also include identifying a fiducial point on a door of the refrigerator appliance based on the two-dimensional image. The method may further include determining a location of the identified fiducial point within the two-dimensional image and selecting a shut state from a plurality of predetermined states based on the determined location of the identified fiducial point.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides systems and methods to aid in detecting when a door of a refrigerator appliance is fully closed. For instance, such systems or methods may employ a camera assembly within the refrigerator appliance to track a predetermined point of the door or a metric (e.g., light intensity) within an image of the chilled chamber.

Figure 1:
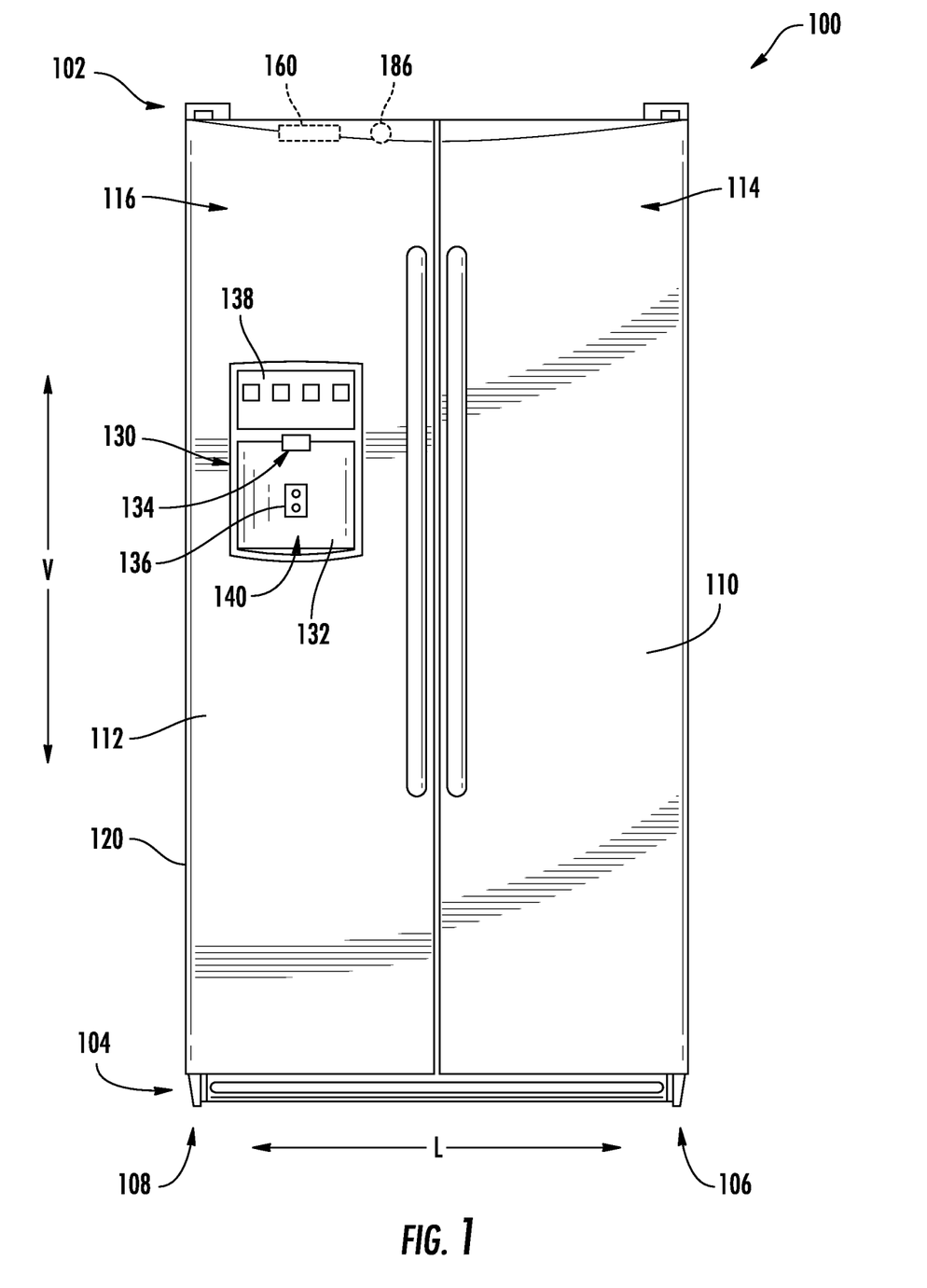
FIG. 1 provides a front elevation view of a refrigerator appliance according to exemplary embodiments of the present disclosure.
Figure 2:
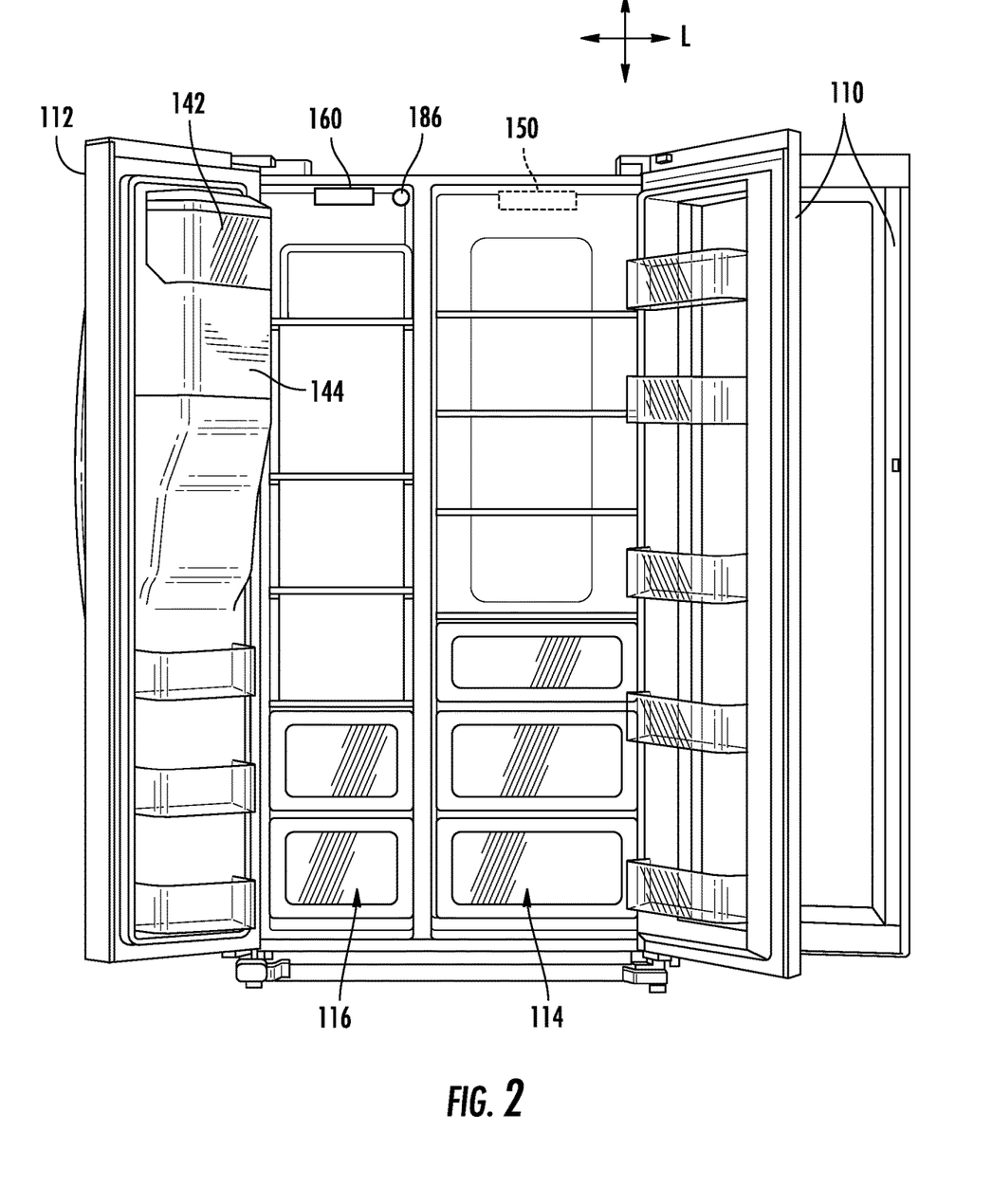
FIG. 2 provides a front elevation view of a refrigerator appliance according to exemplary embodiments of the present disclosure, wherein refrigerator doors are shown in an open position.

FIG. 1 provides a front, perspective view of a refrigerator appliance 100 according to an example embodiment of the present disclosure. FIG. 2 provides a front, perspective view of refrigerator appliance 100 with a refrigerator door 110 and a freezer door 112 of refrigerator appliance 100 shown in an open position to reveal a fresh food chamber 114 and a freezer chamber 116 of refrigerator appliance 100. Refrigerator appliance 100 defines a vertical direction V, a lateral direction L, and a transverse direction. The vertical direction V, lateral direction L, and transverse direction are mutually perpendicular and form an orthogonal direction system. Refrigerator appliance 100 extends between an upper portion 102 and a lower portion 104 along the vertical direction V. Refrigerator appliance 100 also extends between a first side portion 106 and a second side portion 108, e.g., along the lateral direction L.

Refrigerator appliance 100 includes a cabinet 120 that defines chilled chambers for receipt of food items for storage. In some embodiments, refrigerator appliance 100 defines fresh food chamber 114 at first side portion 106 of refrigerator appliance 100 and a freezer chamber 116 arranged next to fresh food chamber 114 at second side portion 108 of refrigerator appliance 100. As such, the illustrated refrigerator appliance 100 is generally referred to as a side-by-side style refrigerator appliance. However, using the teachings disclosed herein, one of skill in the art will understand that the present subject matter may be used with other types of refrigerator appliances (e.g., bottom mount or top mount style) or a dedicated freezer appliance as well. Consequently, the description set forth herein is for illustrative purposes only and is not intended to limit the present disclosure in any aspect.

Refrigerator door 110 is rotatably hinged to an edge of cabinet 120 for accessing fresh food chamber 114. Similarly, freezer door 112 is rotatably hinged to an edge of cabinet 120 for accessing freezer chamber 116. Refrigerator door 110 and freezer door 112 can rotate between an open position (shown in FIG. 2) and a closed position (shown in FIG. 1) in order to permit selective access to fresh food chamber 114 and freezer chamber 116, respectively. As shown, one or more shelves, bins, or drawers may be provided on an inner portion of either door and extend inward toward the corresponding chilled chamber 114 or 116 (e.g., to be received within the corresponding chilled chamber 114 or 116).

Refrigerator appliance 100 may include a dispensing assembly 130 for dispensing water and/or ice. Dispensing assembly 130 includes a dispenser 132 positioned on or mounted to an exterior portion of refrigerator appliance 100, e.g., on freezer door 112. Dispenser 132 may a discharging outlet 134 for accessing ice and water. Any suitable actuator may be used to operate dispenser 132. For example, dispenser 132 can include a paddle or button for operating dispenser. Additionally or alternatively, a sensor 136, such as an ultrasonic sensor, may be mounted below or beneath discharging outlet 134 for operating dispenser 132. A user interface panel 138 may be provided for controlling the mode of operation, or appliance 100. In some such embodiments, user interface panel 138 includes one or more inputs or interfaces (e.g., tactile inputs, such as buttons, or a graphical user interface) for selecting a desired mode of operation, or directing operation generally. Additionally or alternatively, an integrated display may be provided, such as a liquid crystal display panel (LCD), a plasma display panel (PDP), or any other suitable mechanism for displaying an image (e.g., a projector) to visually communicate one or more messages (e.g., visual alerts) to a user.

As shown, discharging outlet 134 and sensor 136 may be provided an external part of dispenser 130. One or both of discharging outlet 134 and sensor 136 are mounted in a dispenser recess 140 defined in an outside surface of freezer door 112. In some embodiments, dispenser recess 140 is positioned at a predetermined elevation convenient for a user to access ice or water and enabling the user to access ice without the need to bend-over and without the need to access freezer chamber 116. In the illustrated embodiment of FIG. 1, dispenser recess 140 is positioned at a level that approximates the chest level of a user.

Turning now to FIG. 2, certain components of dispensing assembly 130 are illustrated. Dispensing assembly 130 includes a housing 142 mounted, as an example, on or within door 112. As door 112 opens and closes, housing 142 may be selectively positioned within and out of freezer chamber 116, respectively. Generally, housing 142 is constructed and arranged to facilitate production and storage of ice. For instance, housing 142 may include or contain an ice maker for creating ice and/or feeding the same to a container 144 below. In some such embodiments, container 144 is mounted on freezer door 112, e.g., below or beneath housing 142. As illustrated in FIG. 2, container 144 is placed at a vertical position on freezer door 112 that may allow for the receipt of ice from a discharge opening of container 144 and into an entrance of container 144. As freezer door 112 is closed or opened, housing 142 and container 144 may be moved together in and out of freezer chamber 116.

Figure 3:
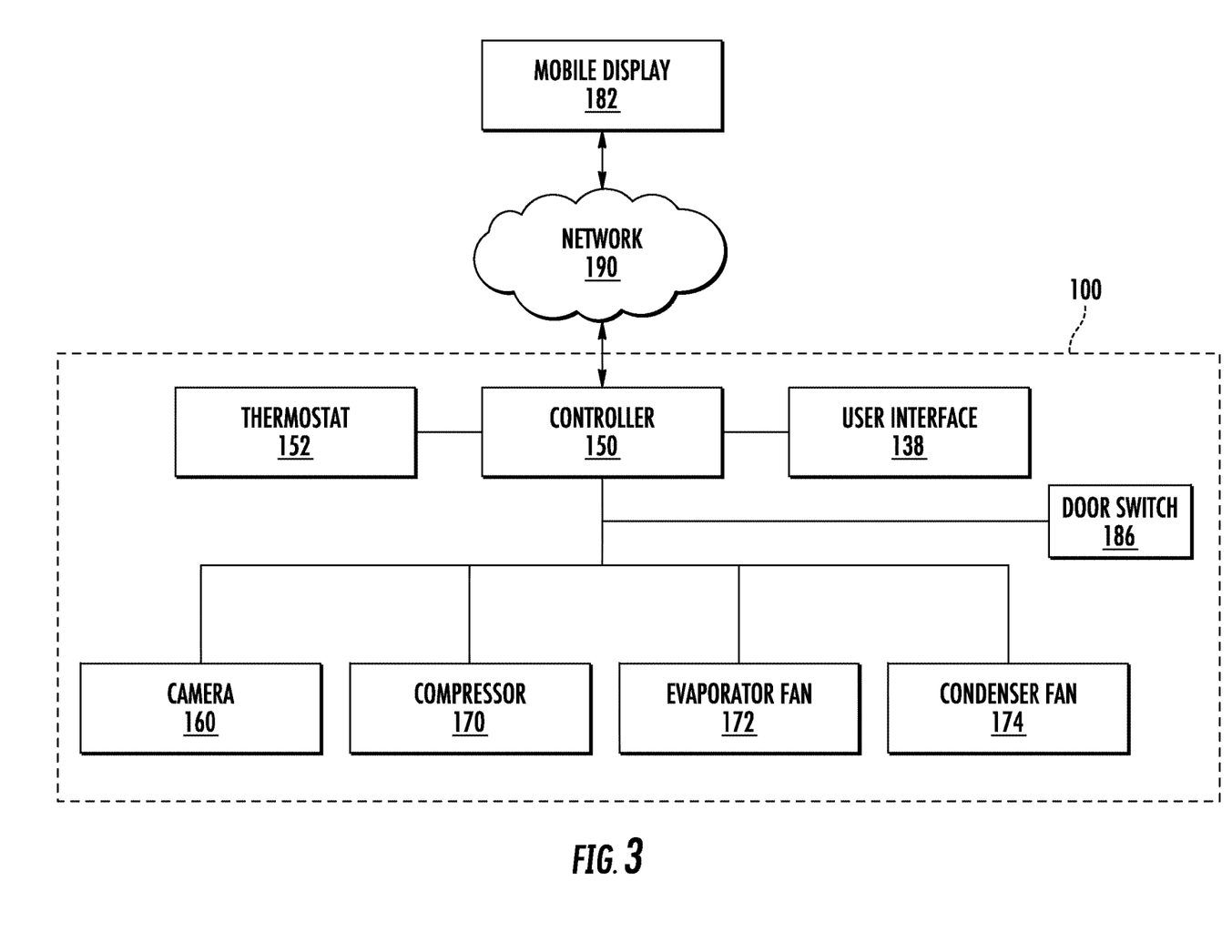
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system of refrigerator appliance 100 configured for cooling fresh food chamber 114 or freezer chamber 116. The components include a compressor 170, an evaporator fan 172, and a condenser fan 174. Controller 150 can selectively operate such components in order to cool fresh food chamber 114 or freezer chamber 116. Controller 150 is also in communication with a thermostat 152 (e.g., a thermocouple or thermistor). The thermostat may be positioned in fresh food compartment 114 or freezer compartment 116 (FIG. 2). Controller 150 may receive a signal from the thermostat that corresponds to a temperature of fresh food compartment 114 or freezer compartment 116. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary methods 600 described below with reference to FIG. 6). The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. For instance, controller 150 may be located at upper portion 102 of refrigerator appliance 100 (e.g., within fresh food chamber 114). Additionally or alternatively, controller 150 may be located within the control panel area of freezer door 112. Input/output ("I/O") signals may be routed between controller 150 and various operational components of refrigerator appliance 100. One or more components of refrigerator appliance 100 may be in operative communication (e.g., electric communication) with controller 150 via one or more conductive signal lines or shared communication busses. Additionally or alternatively, one or more components of refrigerator appliance 100 may be in operative communication (e.g., wireless communication) with controller 150 via one or more wireless signal bands.

Refrigerator appliance 100 also includes a camera or camera module 160. Camera 160 may be any type of device suitable for capturing a two-dimensional picture or image, such as images illustrated in FIG. 4 and FIG. 5. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned within refrigerator appliance 100 and is directed toward one or more chilled chamber (e.g., freezer chamber 116—FIG. 2). In some embodiments, camera 160 is mounted within freezer chamber 116 at a top portion thereof (e.g., adjacent portion 102). For instance, camera 160 may be fixed to or directed through a top wall of an internal liner defining freezer chamber 116. In such embodiments, camera 160 may be directed downward, as illustrated in FIG. 2. When assembled, camera 160 may be directed towards an opening of freezer chamber 116, towards an inner portion of door 112, or freezer chamber 116 generally. Thus, camera 160 can capture images of one of at least a portion of door 112.

In some embodiments, may include a mechanical door switch 186 (e.g., reed switch, pusher switch, Hall effect sensor, etc.) selectively engaged with a door 112 to detect if/when the door 112 is in a nominally open position (e.g., when door switch 186 is depressed or unengaged) or a nominally closed position. For instance, an open-door signal may be received from the door switch 186 in response to the door 112 being moved to a nominally open position (e.g., wherein the door switch 186 closes an electric circuit or transmits a data signal corresponding to the nominally open position). Similarly, a closed-door signal may be received from the door switch 186 in response to the door 112 being moved to a nominally closed position (e.g., wherein the door switch 186 opens an electric circuit or transmits a data signal corresponding to the nominally closed position). Generally, door switches would be understood and may, for instance, simultaneously control activation of a light for illuminating the freezer chamber 116. Widely opening the door 112 to the nominally open position may thus activate the light and transmit a signal indicating detection of a user.

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

Figure 4:
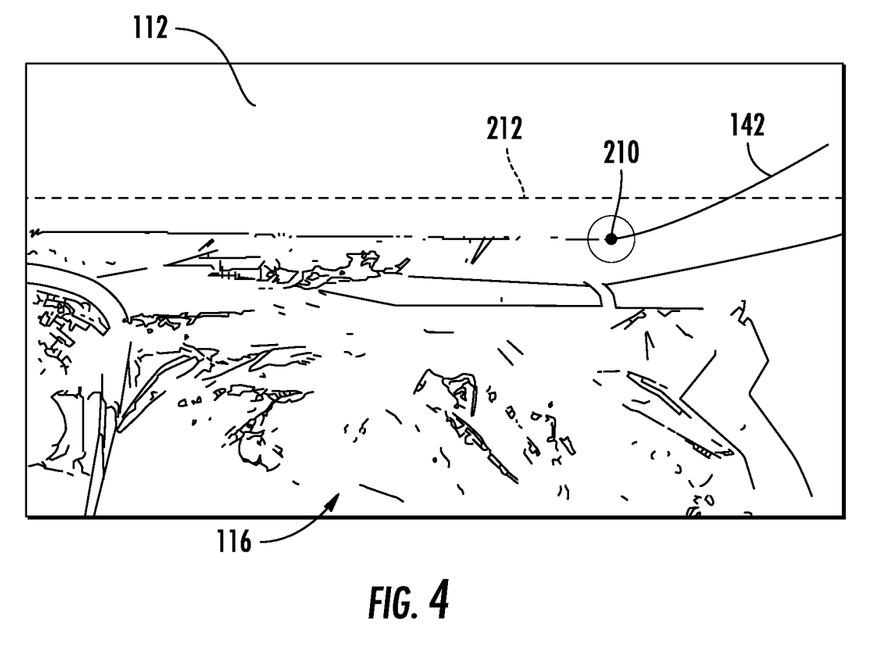
FIG. 4 illustrates an exemplary two-dimensional image of a chilled chamber wherein a door is in a fully closed or shut state.
Figure 5:
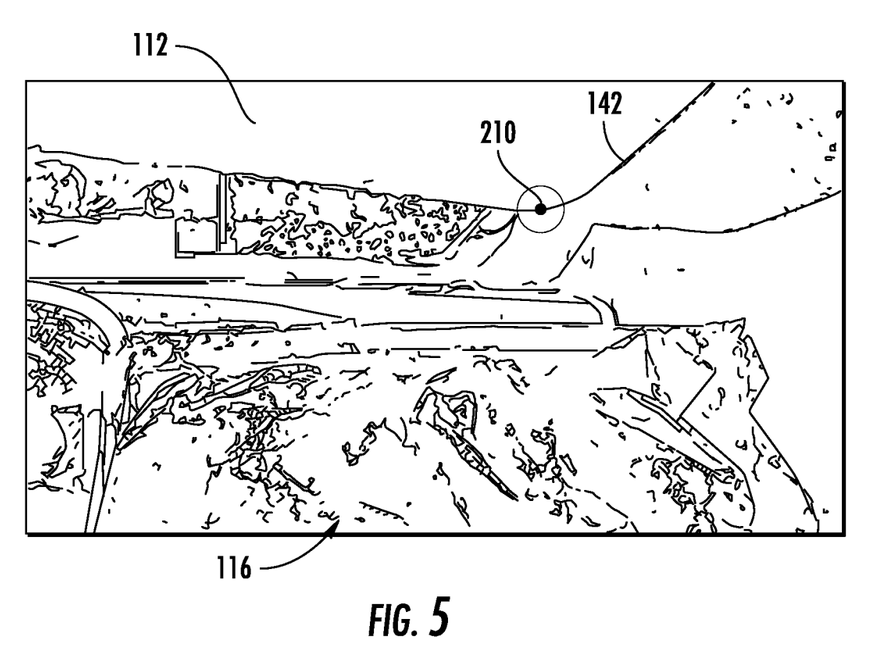
FIG. 5 illustrates an exemplary two-dimensional image of a chilled chamber wherein a door is in a partially opened state.

During use, such as during an image capture sequence, camera 160 may capture one or more two-dimensional images (e.g., as a video feed or series of sequential static images) that may be transmitted to the controller 150 (e.g., as a data signal), as is generally understood. From the captured images, one or more attributes of the freezer chamber 116 may be determined (e.g., concerning the position or state of the corresponding door 112). For instance, such two-dimensional images may be analyzed to detect a specific or predetermined fiducial point 210 within the image. In certain embodiments, the fiducial point 210 represents a known inflection point for an internally extending object (e.g., shelf, bin, or drawer) mounted to the interior of door 112, such as might be provided at a corner of housing 142. Such a fiducial point 210 may be identifiable by a counter line formed by an outer visible edge of the corresponding object on the door 112. Moreover, a fixed or predetermined field of view for camera 160 may permit a location of the fiducial point 210 (e.g., within the captured image and, thus, relative to the cabinet 120) to be determined. Notably, such a fiducial point 210 may be easily or efficiently determined even in relatively low light or with relatively meager processing power. As will be further explained below, a determined location of the fiducial point 210 within the two-dimensional image may be used to indicate or select a shut state of the door (e.g., from a plurality of predetermined states, such as a fully closed state, a partially opened state, or an interference state).

In optional embodiments, a transverse threshold 212 is set for the field of view for the camera 160. Thus, a portion of each captured image may generally represent the transverse threshold 212. In turn, under certain conditions (e.g., when freezer chamber 116 is overly or improperly loaded), an object may extend forward from or beyond the transverse threshold 212. During or as a result of the image analysis, the object may be detected as a mass extending over the transverse threshold 212. Moreover, such a detection may be used to indicate or select a shut state of the door (e.g., an interference state), and may suggest that the contents or food items within freezer chamber 116 should be reorganized if door 112 is to be able to fully closed—or remain in a fully closed state. In certain embodiments, the transverse threshold 212 is set forward from an expected location of the fiducial point 210 in a fully closed or shut state (e.g., within a portion of the captured two-dimensional image that represents a location within freezer chamber 116 closer to the opening or a front end of cabinet 120). Thus, if the fiducial point 210 is not visible within the two-dimensional image or another mass is identified as extending over the transverse threshold 212, it may be determined that the door 112 is in, for example, an interference state.

Generally, one or more items (e.g., including the fiducial point 210) may be identified using a suitable image processing algorithm applied to the capture image. For instance, the image processing algorithms may use suitable techniques for recognizing or identifying items or objects, such as edge matching or detection, divide-and-conquer searching, greyscale matching, histograms of receptive field responses, or another suitable routine (e.g., executed at the controller 150 based on one or more captured images from camera 160). Other image processing techniques are possible and within the scope of the present disclosure. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present disclosure. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present disclosure.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that the image processing algorithms and machine learning image recognition processes described herein are only exemplary and are not intended to limit the scope of the present disclosure in any manner.

Separate from or in addition to recognizing or identifying fiducial point within a captured two-dimensional image, a captured image may be analyzed for one or more elevated image values. For instance, an elevated image value may be detected by any suitable comparison or pixel characteristic, such as brightness value or a color value that might indicate a presence of light in excess of a baseline or expect value (e.g., when door 112 is in a fully closed or shut state).

As would be understood, each pixel within a two-dimensional image or set field of view has a brightness range. Optionally, the brightness range may be an RGB brightness range between, for example, 0 and 255 (e.g., wherein "0" is a minimum RGB pixel-brightness value and "255" is a maximum RGB pixel-brightness value). In certain embodiments, the brightness value for multiple pixels may be detected for a measurement of brightness. For instance, a mean brightness (Bm) value of the pixel-brightness values may be calculated for a corresponding two-dimensional image (or sub-region thereof). Additionally or alternatively, a deviation value may be calculated (e.g., as the brightness value) for multiple pixels in comparison to a balanced value. For instance, the brightness value (Vbr) of a captured image may be calculated as the absolute value of the mean brightness value minus a balanced value (e.g., 125) over the balanced value. In other words, in some embodiments, brightness value may be expressed as $$Vbr=(|Bm-125|)/125.$$

The detected brightness value may then be compared to a predetermined brightness threshold. If the brightness value is above the predetermined brightness threshold, the brightness value may be elevated (e.g., in comparison to an expected brightness value for a fully closed or shut state). Thus, a detected elevated brightness values (e.g., above the predetermined threshold by a set amount, relative percentage, etc.) may indicate the door 128 is open (e.g., in at least a partially opened state).

Figure 6:
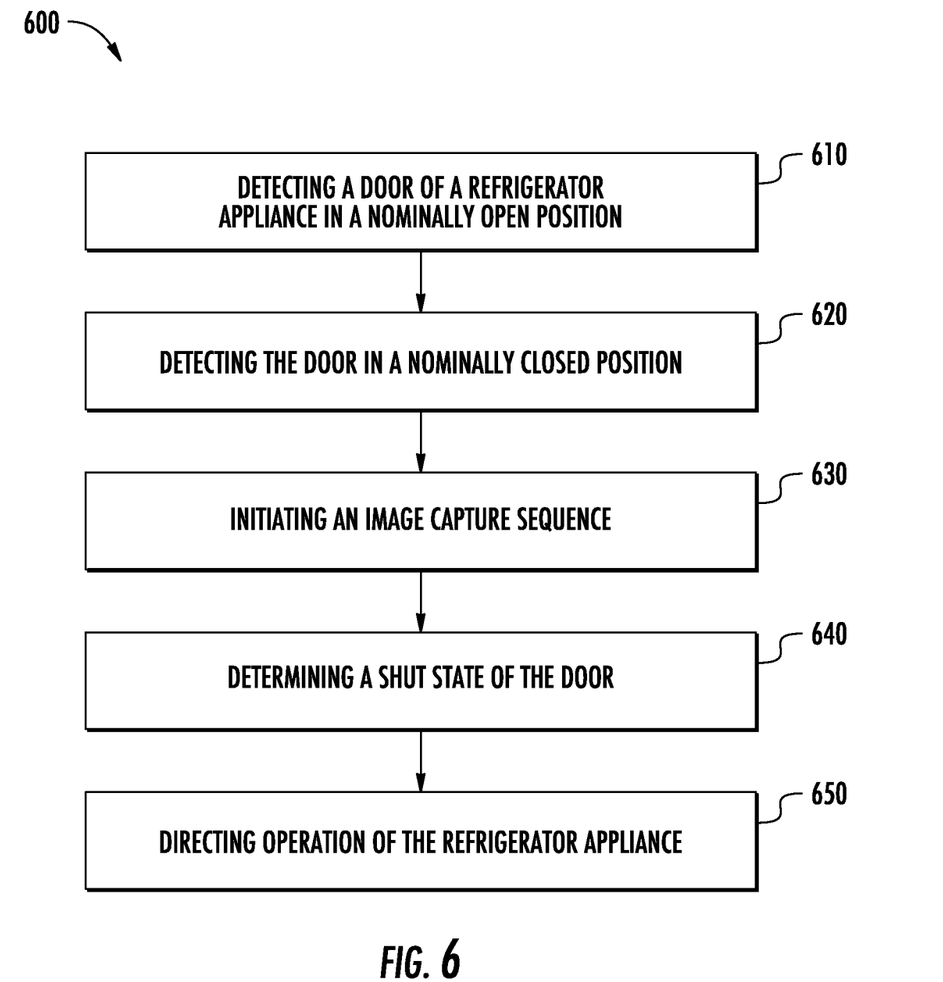
FIG. 6 provides a flow chart illustrating a method of operating a refrigerator appliance according to exemplary embodiments of the present disclosure.

Turning now to FIG. 6, a flow chart is provided of methods (e.g., 600) according to exemplary embodiments of the present disclosure. Generally, the method provides a method of operating a refrigerator appliance 100 (FIG. 1) that includes a camera 160, as described above. The method 600 can be performed, for instance, by the controller 150 (FIG. 3). For example, controller 150 may, as discussed, be in communication with user interface 138, camera 160, door switch 186 (FIG. 3). During operations, controller 150 may send signals to and receive signals from camera 160 or mechanical switch 186. Controller 150 may further be in communication with other suitable components of the appliance 100 to facilitate operation of the appliance 100 generally.

Advantageously, methods in accordance with the present disclosure may efficiently or accurately detect if or when a door to a chilled chamber (e.g., freezer chamber 116) is fully closed or, alternately, partially opened and in need of user attention.

FIG. 6 depicts steps performed in a particular order for purpose of illustration and discussion. Those of ordinary skill in the art, using the disclosures provided herein, will understand that the methods are not mutually exclusive and the steps of any of the methods disclosed herein can be modified, adapted, rearranged, omitted, or expanded in various ways without deviating from the scope of the present disclosure (except as otherwise described or required).

At 610, the method 600 includes detecting a door of a refrigerator appliance in a nominally open position. Such a nominally open position may be a position wherein the door is rotated open and access to the chilled chamber is permitted. For instance, such a nominally open position may be detected apart from the camera, such as by a mechanical door switch. In some such embodiments, 610 includes receiving an open-door signal from the mechanical door switch (e.g., as would be understood in light of the present disclosure).

At 620, the method 600 includes detecting the door in a nominally closed position. Such a nominally closed position may be a position wherein the door is rotated inward away from the open position and access to the chilled chamber is at least partially restricted. The door may even appear to be closed to a user standing in front of the appliance. Such a nominally closed position may be detected apart from the camera, such as by the mechanical door switch. In some such embodiments, 620 includes receiving a closed-door signal from the mechanical door switch (e.g., as would be understood in light of the present disclosure). In some embodiments, 620 follows 610.

At 630, the method 600 includes initiating an image capture sequence. The image capture sequence may include capturing one or more two-dimensional images, such as within a video feed or within one or more (e.g., sequential) static images, which may be taken or captured according to a predetermined rate or condition). Upon being captured at the camera module, the two-dimensional image(s) may be transmitted to the controller (e.g., as a data signal). The two-dimensional images may then be recorded (e.g., temporarily) for analysis, evaluation, or comparison.

In certain embodiments, 630 is prompted by or in response to 620. Optionally, recording or evaluating two-dimensional images from the camera module may be prevented until the nominally closed position is detected (e.g., following 610). The image capture sequence may continue until one or more end conditions are met. As an example, an end condition may include capturing a single image. As another example, an end condition may include expiration of a predetermined time period (e.g., span of time) following the start of 620. As yet another example, an end condition may include failure to detect further changes in sequential images of the image capture sequence. In other words, the image capture sequence may end after sequential images stop changing or detecting further movement. The end condition may specifically require a preset number or time period of unchanged sequential images.

At 640, the method 600 includes determining a shut state of the door based on the captured image(s) at 630. For example, the door may be determined to be in a specific shut state (e.g., out of a plurality of predetermined states). Such states may confirm, contradict, or complement the detected nominally closed position. In some embodiments or under certain conditions, the determined shut state may be a fully closed state (e.g., confirming the detected nominally closed position). Thus, the door may be confirmed to be fully closed. In other embodiments or under certain conditions, the determined shut state may be a partially opened state (e.g., confirming the detected nominally closed position). Thus, the door may be detected as partially opened in spite of the determination of the nominally closed position. In still other embodiments or under certain conditions, the determined shut state may be an interference position. Thus, it may be determined that the nominally closed position cannot be confirmed or that an opening of the door is likely.

In making the determination of 640, the two-dimensional may be analyzed (e.g., as described above). Thus, one or more items may be identified or a determination may be made regarding one or more elevated image values.

In some embodiments, 640 includes identifying a fiducial point on the door based on the two-dimensional image. As described above, the fiducial point may represents a known inflection point for an internally extending object (e.g., shelf, bin, or drawer) mounted to the interior of the door. From the identified fiducial point, a location of the fiducial point may be determined. Specifically, the location of the identified fiducial point may be determined. The location may be determined, for instance, as a coordinate within the two-dimensional image (e.g., fixed field of view for the camera). Based on the determined location of the identified fiducial point, 640 may optionally include selecting the shut state from a plurality of predetermined states.

In certain embodiments, it may be determined in advance where the fiducial point should be in the fully closed state (i.e., an intended location). Thus, if the location of the fiducial point is compared to the intended location and determined to match the same, it may be determined that the door is in the fully closed state. By contrast, if the location of the fiducial point is compared to the intended location and determined to be outside of (e.g., forward from) the intended location, it may be determined that the door is in the partially opened state. If the location of the fiducial point is inconclusive (e.g., because the fiducial point is unidentifiable within the image) or a mass is identified as extending over a transverse threshold within the two-dimensional image, it may be determined that the door is in the interference state.

Separate from or in addition to identifying fiducial point within a captured two-dimensional image, 640 may include analyzing the captured image for one or more elevated image values. For instance, a brightness value or a color value of the captured image may be measured (e.g., as would be understood in light of the present disclosure) and compared to a predetermined brightness threshold. Thus, if the measured brightness value is compared to the predetermined brightness threshold and determined to be less than or equal to the predetermined brightness threshold, it may be determined that the door is in the fully closed state. By contrast, if the measured brightness value is compared to the predetermined brightness threshold and determined to be greater than the predetermined brightness threshold, it may be determined that the door is in the partially opened state.

At 650, the method 600 includes directing operation of the refrigerator appliance (e.g., based on 640). As an example, if a partially opened state is determined at 640 (e.g., in response to the same), 650 may include generating an alert corresponding to the partially opened state at a display of the refrigerator appliance (e.g., display of the user interface or mobile display of a user device). Generally, the alert message may include text or images indicating the partially opened state. Optionally, static images or video clips may be provided to illustrate how the fog condition may be addressed or resolved (e.g., by rearranging objects or items within the chilled chamber). As an additional or alternative example, if an interference state is determined at 640 (e.g., in response to the same), 650 may include generating an alert corresponding to the interference state at a display of the refrigerator appliance (e.g., display of the user interface or mobile display of a user device). Generally, the alert message may include text or images indicating the interference state. Optionally, static images or video clips may be provided to illustrate how the fog condition may be addressed or resolved (e.g., by rearranging objects or items within the chilled chamber). As another or additional or alternative example, if a fully closed state is determined at 640 (e.g., in response to the same), 650 may include directed the user interface of the refrigerator appliance to a closed door mode (e.g., wherein user interface may be engaged by a user or is generally available to receive and respond to user inputs).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a cabinet defining a chilled chamber and an opening thereto, a door rotatably hinged to the cabinet to provide selective access to the chilled chamber through the opening, a door switch in selective engagement with the door in a closed position of the door, and a camera module mounted within the chilled chamber of the refrigerator appliance, the method comprising:
   detecting the door to the chilled chamber in a nominally open position permitting access to the chilled chamber through the opening;
   detecting the door in a nominally closed position following detecting the door in the nominally open position;
   initiating an image capture sequence to capture a two-dimensional image of the chilled chamber in response to detecting the door in the nominally closed position; and
   determining a shut state of the door based on the two-dimensional image.

2. The method of claim 1, wherein detecting the door in the nominally open position comprises receiving an open-door signal from a mechanical switch in selective engagement with the door, and wherein detecting the door in the nominally closed position comprises receiving a closed-door signal from the mechanical switch.

3. The method of claim 1, wherein the determined shut state is a fully closed state confirming the detected nominally closed position.

4. The method of claim 1, wherein the determined shut state is a partially opened state contradicting the detected nominally closed position.

5. The method of claim 4, further comprising generating an alert at the refrigerator appliance based on determining the partially opened state.

6. The method of claim 4, wherein determining the shut state comprises measuring a brightness value within the two-dimensional image.

7. The method of claim 1, wherein determining the shut state comprises detecting a mass extending over a transverse threshold within the two-dimensional image, and determining an interference state based on detecting the mass.

8. The method of claim 7, further comprising generating an alert at the refrigerator appliance based on determining the interference state.

9. The method of claim 1, wherein determining the shut state comprises
   identifying a fiducial point on the door based on the two-dimensional image,
   determining a location of the identified fiducial point within the two-dimensional image, and
   selecting the shut state from a plurality of predetermined states based on the determined location of the identified fiducial point.

10. A refrigerator appliance comprising:
    a cabinet defining a chilled chamber and an opening through which the chilled chamber is accessible;
    a door being rotatably hinged to the cabinet to provide selective access to the chilled chamber through the opening;
    a door switch attached to the cabinet in selective engagement with the door in a closed position thereof;
    a camera module mounted to the cabinet within the chilled chamber; and
    a controller operably coupled to the camera module, the controller being configured to initiate an operation routine comprising
    detecting the door to the chilled chamber in a nominally open position,
    detecting the door in a nominally closed position following detecting the door in the nominally open position,
    initiating an image capture sequence to capture a two-dimensional image of the chilled chamber in response to detecting the door in the nominally closed position, and
    determining a shut state of the door based on the two-dimensional image.

11. The refrigerator appliance of claim 10, further comprising a mechanical switch in selective engagement with the door,
    wherein detecting the door in the nominally open position comprises receiving an open-door signal from the mechanical switch, and
    wherein detecting the door in the nominally closed position comprises receiving a closed-door signal from the mechanical switch.

12. The refrigerator appliance of claim 10, wherein the determined shut state is a fully closed state confirming the detected nominally closed position.

13. The refrigerator appliance of claim 10, wherein the determined shut state is a partially opened state contradicting the detected nominally closed position.

14. The refrigerator appliance of claim 13, wherein the operation routine further comprises generating an alert at the refrigerator appliance based on determining the partially opened state.

15. The refrigerator appliance of claim 13, wherein determining the shut state comprises measuring a brightness value within the two-dimensional image.

16. The refrigerator appliance of claim 10, wherein determining the shut state comprises detecting a mass extending over a transverse threshold within the two-dimensional image, and determining an interference state based on detecting the solid mass.

17. The refrigerator appliance of claim 16, further comprising generating an alert at the refrigerator appliance based on determining the interference state.

18. The refrigerator appliance of claim 10, wherein determining the shut state comprises
    identifying a fiducial point on the door based on the two-dimensional image, determining a location of the identified fiducial point within the two-dimensional image, and selecting the shut state from a plurality of predetermined states based on the determined location of the identified fiducial point.

19. A method of operating a refrigerator appliance comprising a cabinet defining a chilled chamber and an opening thereto, a door rotatably hinged to the cabinet to provide selective access to the chilled chamber through the opening, a door switch in selective engagement with the door in a closed position of the door, and a camera module mounted within the chilled chamber of the refrigerator appliance, the method comprising:

initiating an image capture sequence to capture a two-dimensional image of the chilled chamber;

identifying a fiducial point on a door of the refrigerator appliance based on the two-dimensional image;

determining a location of the identified fiducial point within the two-dimensional image; and selecting a shut state of the door from a plurality of predetermined states based on the determined location of the identified fiducial point, the door permitting selective access to a cabinet of the refrigerator appliance through the opening defined by the cabinet.

20. The method of claim 19, wherein determining the location of the identified fiducial point within the two-dimensional image comprises detecting a mass extending over a transverse threshold within the two-dimensional image, and determining an interference state based on detecting the mass.

* * * * *